US012226886B2

(12) United States Patent
Koschel et al.

(10) Patent No.: US 12,226,886 B2
(45) Date of Patent: Feb. 18, 2025

(54) METHOD FOR OPERATING A MACHINE TOOL, AND MACHINE TOOL

(71) Applicant: Hilti Aktiengesellschaft, Schaan (LI)

(72) Inventors: Christian Koschel, Augsburg (DE); Jan Friedmann, Denklingen (DE); Stoyanka Ivanova, Landberg am Lech (DE)

(73) Assignee: Hilti Aktiengesellschaft, Schaan (LI)

( * ) Notice: Subject to any disclaimer, the term of this patent is extended or adjusted under 35 U.S.C. 154(b) by 240 days.

(21) Appl. No.: 17/774,335

(22) PCT Filed: Nov. 9, 2020

(86) PCT No.: PCT/EP2020/081454
§ 371 (c)(1),
(2) Date: May 4, 2022

(87) PCT Pub. No.: WO2021/099157
PCT Pub. Date: May 27, 2021

(65) Prior Publication Data

US 2022/0402110 A1 Dec. 22, 2022

(30) Foreign Application Priority Data

Nov. 21, 2019 (EP) .................................... 19210606

(51) Int. Cl.
*B25F 5/00* (2006.01)
*B24B 23/02* (2006.01)

(52) U.S. Cl.
CPC ............ *B25F 5/001* (2013.01); *B24B 23/028* (2013.01)

(58) Field of Classification Search
CPC ........................................................ B25F 5/001
See application file for complete search history.

(56) References Cited

U.S. PATENT DOCUMENTS 3,904,305 A * 9/1975 Boyd ...................... F01B 25/16 415/36
4,444,272 A * 4/1984 Karden .................. B24B 55/00 91/59

(Continued)

FOREIGN PATENT DOCUMENTS

CN 101152865 A 4/2008
CN 202077393 U 12/2011

(Continued)

OTHER PUBLICATIONS

International Search Report of PCT/EP2020/081454, Feb. 5, 2021.
International Search Report of PCT/EP2020/081462, Feb. 5, 2021.
International Search Report of PCT/EP2020/082081, Mar. 2, 2021.

*Primary Examiner* — Gloria R Weeks
(74) *Attorney, Agent, or Firm* — Davidson Kappel LLC

(57) ABSTRACT

A method for operating a machine tool, in particular an angle grinder, including a tool rotatably bringable into operative connection with a driven shaft, the machine tool having a drive device for actuating the driven shaft, a control device for actuating the drive device and at least one sensor device operatively connected to the control device. The method has the following steps: determining a speed value of the driven shaft; determining a speed value of the tool using the sensor device, which interacts with the tool, controlling an output device and/or controlling, in a predefined manner, the drive device via the control device when a difference between the determined speed value of the driven shaft and the determined speed value of the tool is greater than a defined limit value. A machine tool for carrying out a method of this kind is also described.

17 Claims, 2 Drawing Sheets

(56) References Cited

U.S. PATENT DOCUMENTS

| | | | | | |
|---|---|---|---|---|---|
| 5,154,242 | A * | 10/1992 | Soshin | B25B 23/147 173/180 |
| 5,563,482 | A * | 10/1996 | Shaw | B23P 19/066 318/272 |
| 6,029,754 | A * | 2/2000 | Kattentidt | E21B 44/06 175/27 |
| 6,836,614 | B2 * | 12/2004 | Gilmore | B25F 5/001 173/4 |
| 6,860,792 | B2 | 3/2005 | Krondorfer et al. | |
| 6,945,337 | B2 * | 9/2005 | Kawai | B25B 21/026 173/183 |
| 7,085,620 | B2 * | 8/2006 | Maeda | G05B 19/404 700/193 |
| 7,395,871 | B2 * | 7/2008 | Carrier | B25F 5/00 173/183 |
| 7,419,013 | B2 * | 9/2008 | Sainomoto | B25B 23/1405 173/104 |
| 8,544,559 | B2 * | 10/2013 | Friberg | B24B 49/08 173/218 |
| 2003/0089511 | A1 * | 5/2003 | Tsuneda | B25B 21/00 173/217 |
| 2006/0081386 | A1 | 4/2006 | Zhang et al. | |
| 2006/0243469 | A1 * | 11/2006 | Webster | A47J 43/1037 173/217 |
| 2007/0007023 | A1 | 1/2007 | Becker et al. | |
| 2008/0076622 | A1 | 3/2008 | Manken et al. | |
| 2012/0305279 | A1 * | 12/2012 | Schadow | B25B 23/14 173/171 |
| 2012/0318545 | A1 * | 12/2012 | Schreiber | B25F 3/00 173/1 |
| 2015/0148937 | A1 | 5/2015 | Wolf et al. | |
| 2016/0001411 | A1 | 1/2016 | Alberti et al. | |
| 2016/0046035 | A1 | 2/2016 | Laghate et al. | |
| 2016/0375570 | A1 | 12/2016 | Boeck et al. | |
| 2017/0066068 | A1 | 3/2017 | Hanussek et al. | |
| 2018/0358918 | A1 * | 12/2018 | Erickson | A01G 3/037 |
| 2020/0122288 | A1 | 4/2020 | Kuhlmann et al. | |
| 2020/0122292 | A1 | 4/2020 | Kuhlmann et al. | |
| 2020/0180104 | A1 | 6/2020 | Hug et al. | |
| 2020/0206887 | A1 | 7/2020 | Schmid et al. | |

FOREIGN PATENT DOCUMENTS

| | | | |
|---|---|---|---|
| CN | 105051626 | A | 11/2015 |
| CN | 106573319 | A | 4/2017 |
| DE | 102004046000 | A1 | 3/2006 |
| DE | 102008055057 | A1 | 6/2010 |
| DE | 102013211997 | A1 | 1/2015 |
| DE | 102013113202 | A1 | 5/2015 |
| DE | 10 2015217054 | A1 | 3/2017 |
| DE | 102016216794 | A1 | 3/2017 |
| EP | 0588057 | A2 | 3/1994 |
| EP | 3292969 | A1 | 3/2018 |
| EP | 3391993 | A1 | 10/2018 |
| EP | 3391995 | A1 | 10/2018 |
| GB | 2466383 | B | 3/2014 |
| KR | 20150037430 | A | 4/2015 |
| WO | WO 0243920 | A1 | 6/2002 |
| WO | 102015217053 | A1 | 3/2017 |
| WO | WO 2018210607 | A1 | 11/2018 |
| WO | WO 2019020165 | A1 | 1/2019 |
| WO | WO 2021/099157 | A1 | 5/2021 |
| WO | WO 2021/099160 | A1 | 5/2021 |
| WO | WO 2021/099221 | A1 | 5/2021 |

* cited by examiner

METHOD FOR OPERATING A MACHINE TOOL, AND MACHINE TOOL

The invention relates to a method for operating a machine tool, in particular an angle grinder, comprising a tool, for example a cutting, grinding or diamond disk, that can be rotatably brought into operative connection with a driven shaft, and to a machine tool for carrying out a method of this kind.

SUMMARY OF THE INVENTION

When using machine tools, for example angle grinders, sawing machines or the like, there is the risk that the tool driven by the machine tool, for example a cutting, grinding or diamond disk of an angle grinder or of a saw blade of a sawing machine, becomes detached from the driven shaft, in particular during the machining of a material, such as wood or concrete. As a result, it is possible that the tool becoming detached leads to injury to the user or damage to the machine tool.

It is an object of the present invention to provide a method for operating a machine tool, by means of which method a tool becoming detached from the driven shaft is easily and reliably detected and the risk of injury to a user of the machine tool and of damage to the machine tool is reduced. In addition, an object of the present invention is that of providing a machine tool for carrying out a method of this kind.

The present invention provides a method for operating a machine tool, in particular an angle grinder, comprising a tool that can be rotatably brought into operative connection with a driven shaft, the machine tool having a drive device for actuating the driven shaft, a control device for actuating the drive device and at least one sensor device operatively connected to the control device.

According to the invention, the method has the following method steps:

- determining a speed value of the driven shaft;
- determining a speed value of the tool using the sensor device;
- controlling an output device and/or controlling, in a predefined manner, the drive device by means of the control device when a difference between the determined speed value of the driven shaft and the determined speed value of the tool is greater than a defined limit value.

By means of an embodiment, according to the invention, of a method for operating a machine tool, a tool becoming detached from the driven shaft can be in particular easily and reliably detected and responded to. The risk of injury to a user of the machine tool and of damage to the machine tool can be effectively reduced by introducing appropriate measures. By means of a method according to the invention, by comparing the difference between the determined speed values of the driven shaft and of the tool with the limit value, it is easy to distinguish between safe operation and unsafe operation.

In particular, the limit value is substantially equal to zero, since a speed of the tool that deviates from the speed of the driven shaft indicates that the tool is becoming detached.

In the event that there is a ratio between a region of the driven shaft at which its speed is determined and a region of the driven shaft to which the tool is connected, the ratio is to be included in the comparison of the speed values.

The method according to the invention can in principle be used for all machine tools that have a tool that is rotatably connected to a driven shaft, and therefore said method can also be used, for example, for circular saws, drills or the like.

In an advantageous embodiment of a method according to the invention, the speed value of the driven shaft can be determined in a manner that is simple in terms of design and inexpensive by evaluating a motor current and/or by means of an angle sensor that interacts with the driven shaft, for example via a Hall sensor that interacts with a magnetic disk.

The sensor device can determine the speed of the tool, preferably on the basis of an optical, magnetic and/or electrostatic operating principle or the like, the tool used in each case being appropriately designed so that the sensor device can determine the speed of the tool. For example, for this purpose the tool has a predetermined surface facing the sensor device, the surface having a shape that varies in the circumferential direction, for example.

The output device can be designed to output an acoustic and/or optical and/or haptic warning signal in order to quickly indicate to the user that there is a dangerous situation to the effect that a difference between the determined speed of the driven shaft and the determined speed of the tool is greater than the defined limit value and in particular that there is a tool becoming detached.

In order to be able to prevent injury to a user and damage to the machine tool particularly reliably, the control device switches off the drive device when the defined limit value is exceeded. The control device preferably actively brakes the drive device such that the driven shaft comes to a standstill particularly quickly and the risk of injury to a user and damage to the machine tool is further reduced.

The present invention also provides a machine tool, in particular an angle grinder, comprising a tool that can be rotatably brought into operative connection with a driven shaft, the machine tool having a drive device for actuating the driven shaft, a control device for actuating the drive device and at least one sensor device that interacts with the control device, the machine tool being designed to carry out a method that is described in more detail above.

The advantages stated for the method according to the invention also apply, mutatis mutandis, to a machine tool designed according to the invention. With a machine tool designed according to the invention, it is therefore possible to prevent injury to a user and damage to the machine tool in a simple and reliable manner, in particular in the event that the tool becomes detached from the driven shaft.

Further advantages can be found in the following description of the drawings. An embodiment of the present invention is shown in the drawings. The drawings, the description and the claims contain numerous features in combination. A person skilled in the art will expediently also consider the features individually and combine them to form meaningful further combinations.

DETAILED DESCRIPTION

Figure 1:
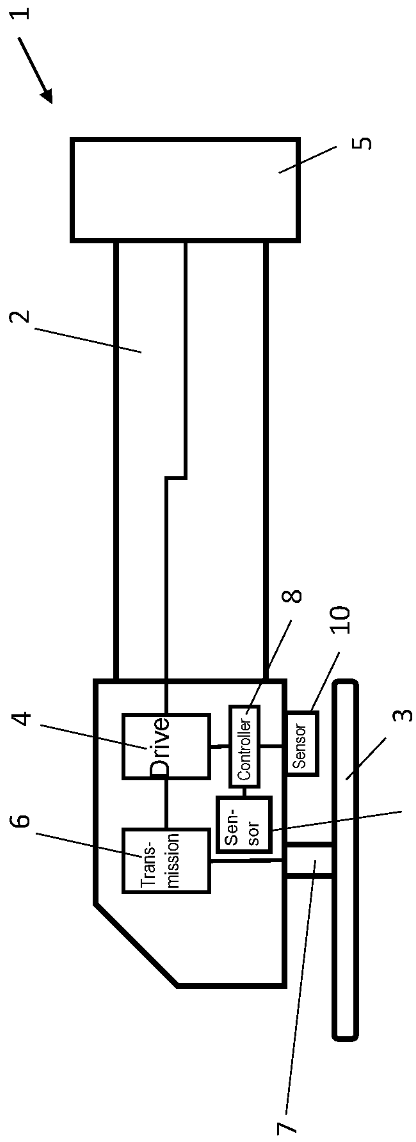
FIG. 1 is a greatly simplified side view of a hand-held machine tool designed as an angle grinder, a tool designed as a cutting disk being arranged on a driven shaft of the angle grinder.

FIG. 1 shows a machine tool or hand-held machine tool 1 according to the invention, which is designed as an angle grinder in the illustration shown. According to an alternative embodiment, the machine tool 1 can also be designed as a drilling machine, as a sawing machine, for example a circular saw, or the like.

The machine tool 1, which is designed as an angle grinder in the drawings, has a housing 2 and a tool 3, which is, for example, designed as a cutting disk. The housing 2 preferably has at least one holding region at which a user can hold and guide the machine tool 1 using one or both hands. The tool 3 can be actuated by a drive, which is in particular designed as an electric motor, or a drive device 4, which can be supplied with current in particular by means of an accumulator 5 that can be connected to the hand-held machine tool 1. According to an alternative embodiment (not shown in the drawings), the hand-held machine tool 1 can also be supplied with electrical current from a network by means of a power cable.

The drive 4 for actuating the tool 3 in a rotating movement is arranged in the interior of the housing 2 along with a transmission 6 and a driven shaft 7. The drive 4, which is designed, for example, as an electric motor, the transmission 6 and the driven shaft 7 are arranged in the housing 2 relative to one another and are interconnected in such a way that a torque generated by the electric motor 4 can be transmitted to the transmission 6 and finally to the driven shaft 7. A freely rotating end of the driven shaft 7 that projects downward from the housing 2 is connected to the tool, which is designed here as a cutting disk 3, for example via a clamping device (not shown in more detail). The torque of the driven shaft 7 can thus be transmitted to the cutting disk 3.

The hand-held machine tool 1 also has a control device 8 and, in the present case, two sensor devices 9 and 10. The sensor devices 9 and 10 are electrically and electronically connected to the control device 8. Signals can be sent between the sensor devices 9 and 10 and the control device 8. The control device 8 is in turn electrically and electronically connected to the electric motor 4 and the accumulator 5. Signals can be sent between the sensor devices 9 and 10 and the electric motor 4 and the accumulator 5. The control device 8 is used, inter alia, for controlling and regulating the drive 4 and for supplying power to the hand-held machine tool 1.

In the present case, the first sensor device 9 is designed to determine a speed of the driven shaft 7 and is designed, for example, as an angle sensor. The speed values of the driven shaft 7 that are determined by the first sensor device 9 are transmitted from the first sensor device 9 to the control device 8. Alternatively, it is also possible for speed values of the driven shaft 7 to be determined by evaluating a motor current of the electric motor 4.

The second sensor device 10 is designed in the present case as an optical sensor device and directly determines a speed of the tool 3 by interacting with a surface of the tool 3 that varies in the circumferential direction of the tool 3. Optical markings of the tool 3 are used, for example, to determine the speed of the tool 3. The speed values of the tool 3 that are determined by the second sensor device 10 are transmitted from the second sensor device 10 to the control device 8.

As an alternative to the embodiment as an optical sensor device, the second sensor device can also determine a speed of the tool 3 by interaction with the tool 3 on the basis of a magnetic, electrostatic or other physical operating principle. The speed of the tool 3 can also be determined on the basis of a magnetic resistance (reluctance) or an electrical resistance.

Figure 2:
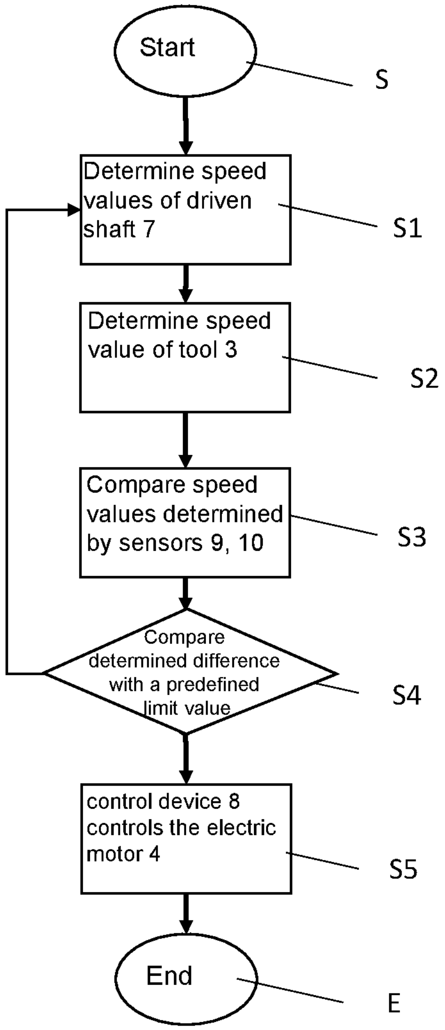
FIG. 2 is a flow chart of an embodiment of a method according to the invention.

FIG. 2 shows, in a simplified manner, the sequence of an embodiment of a method according to the invention, by means of which method injury to a user and damage to the machine tool 1, for example due to a tool 3 becoming detached from the driven shaft 7, can be prevented in a simple and reliable manner.

The method begins at the start S, in particular when the electric motor 4 is actuated. In a first step S1, speed values of the driven shaft 7 are determined by means of the first sensor device 9 and said values are transmitted to the control device 8. In a second step S2, which is carried out in particular at the same time as the first step S1, speed values of the tool 3 are determined by means of the second sensor device 10 and said values are transmitted to the control device 8.

The control device 8 compares, in step S3, the speed values determined in particular simultaneously by the sensor devices 9, 10, by subtracting in particular the respective speed values of the tool 3 that are determined at a specific point in time by the second sensor device 10 from the speed value of the driven shaft 7 that is determined at the substantially identical point in time by the first sensor device 9.

In step S4, the control device 8 compares the determined difference with a predefined limit value, which is in particular equal to zero or preferably has a small value, and checks whether the difference is greater than the predefined limit value.

If the query result is negative, the method is continued with step S1.

If the query result from step S4 is positive, which can be attributed, for example, to detachment of the tool 3 from the driven shaft 7, i.e. if the difference is greater than the predefined limit value, the control device 8 controls the electric motor 4 in step S5 such that the electric motor 4 is actively braked and the driven shaft 7 quickly comes to a standstill. In this way, injury to a user and damage to the machine tool 1 caused by a tool 3 becoming detached can be prevented in a simple and reliable manner. In addition to the active braking of the electric motor 4, for this purpose the user can alternatively or additionally be given acoustic, optical or haptic feedback via an output device in the event that the predefined limit value is exceeded.

In step E, the method is ended in particular when the electric motor 3 is no longer operated by the user.

The invention claimed is:

1. A method for operating a machine tool having a tool rotatably bringable into operative connection with a driven shaft, wherein the machine tool has a drive for actuating the driven shaft, a controller for actuating the drive and at least one sensor operatively connected to the controller, the method comprising the steps of:

determining a speed of the driven shaft;

determining a speed of the tool using the sensor interacting with the tool; and controlling an output device or controlling, in a predefined manner, the drive via the controller when a difference between the determined value of the driven shaft and the determined speed value of the tool is greater than a defined limit value.

2. The method as recited in claim 1 wherein the speed value of the driven shaft is determined by evaluating a motor current or via an angle sensor interacting with the driven shaft.

3. The method as recited in claim 1 wherein the sensor determines the speed of the tool is an optical, magnetic or electrostatic sensor.

4. The method as recited in claim 1 wherein the output device is controlled, the output device designed to output an acoustic or optical or haptic signal.

5. The method as recited in claim 1 wherein the controlling the drive in the predefined manner includes the controller switching off the drive when the defined limit value is exceeded.

6. The method as recited in claim 1 wherein the machine tool is an angle grinder.

7. A machine tool for carrying out the method as recited in claim 1, a tool rotatably bringable into operative connection with the driven shaft, the machine tool comprising the drive for actuating the driven shaft, the controller for actuating a drive device and the at least one sensor interacting with the controller.

8. The machine tool as recited in claim 7 wherein the machine tool is an angle grinder.

9. The machine tool as recited in claim 7 further comprising a housing, the housing including an at least one holding region where a user can hold and guide the machine tool.

10. The machine tool as recited in claim 9 wherein the driven shaft has a free end, the free end projecting downward from the housing.

11. The machine tool as recited in claim 7 wherein the controller is supplied with an electrical current by an accumulator or a power cable.

12. The machine tool as recited in claim 11 wherein the controller is supplied the electrical current by the accumulator and the controller is electrically and electronically connected to the drive and the accumulator.

13. The machine tool as recited in claim 12 wherein a connection between the at least one sensor, the drive and the accumulator permits a plurality of signals to be sent.

14. The machine tool as recited in claim 7 wherein the drive generates a torque, the torque being transmitted from the drive to the tool via the transmission and the driven shaft.

15. The machine tool as recited in claim 7 wherein the at least one sensor is electrically and electronically connected to the controller.

16. The machine tool as recited in claim 7 wherein the drive is an electric motor.

17. The method as recited in claim 1 wherein the tool has a speed determined on the basis of a magnetic or an electric resistance.

* * * * *